(12) United States Patent
Friedrich et al.

(10) Patent No.: US 6,537,512 B1
(45) Date of Patent: Mar. 25, 2003

(54) METHOD FOR PRODUCING HIGHLY PURE LIBF$_4$

(75) Inventors: Holger Friedrich, Bobenheim-Roxheim (DE); Joachim Simon, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/743,919

(22) PCT Filed: Jul. 20, 1999

(86) PCT No.: PCT/EP99/05169

§ 371 (c)(1),
(2), (4) Date: Jan. 17, 2001

(87) PCT Pub. No.: WO00/07937

PCT Pub. Date: Feb. 17, 2000

(30) Foreign Application Priority Data

Aug. 6, 1998  (DE) ......................................... 198 35 595

(51) Int. Cl.[7] ............................................... C01B 35/06
(52) U.S. Cl. ....................................... 423/276; 423/472
(58) Field of Search ................................ 429/188, 189, 429/323, 199; 423/464, 276, 472

(56) References Cited

FOREIGN PATENT DOCUMENTS

| JP | 56-145113 | 11/1981 |
| JP | 61-151023 | 7/1986 |
| JP | 61-151024 | 7/1986 |
| JP | 11-157830 | 6/1999 |
| SU | 1013405 | 4/1983 |
| SU | 1655083 A1 * | 7/1994 |

OTHER PUBLICATIONS

JACS, 75 (1953), 1753, No Month Available.

* cited by examiner

*Primary Examiner*—Stephen Kalafut
*Assistant Examiner*—Susy Tsang-Foster
(74) *Attorney, Agent, or Firm*—Keil & Weinkauf

(57) ABSTRACT

Highly pure LiBF$_4$ is prepared by preparing a solution of BF$_3$ etherate in diethyl ether, suspending LiF in this solution, reacting to give solid LiBF$_4$, and then separating off the solid LiBF$_4$ formed. The LiBF$_4$ prepared is used for producing lithium ion batteries.

4 Claims, No Drawings

METHOD FOR PRODUCING HIGHLY PURE LIBF$_4$

FIELD OF THE INVENTION

The invention relates to a process for preparing highly pure LiBF$_4$ in diethyl ether, and also to its use for producing lithium ion batteries.

LiBF$_4$ can be used as a conducting salt for electrolytes in primary cells or secondary cells. In particular, it is used in rechargeable lithium ion batteries. The electrolytes are non-aqueous solutions of LiBF$_4$ in organic media, e.g. in diethyl carbonate, dimethyl carbonate, ethylene carbonate or propylene carbonate or others, or mixtures of the solvents mentioned.

Very high requirements are placed upon the purity of the LiBF$_4$ for this application. A particular requirement is that the LiBF$_4$ has a very low content of free hydrogen fluoride, very low water content, and only very small amounts of foreign metal ions. Contamination with organic carbon compounds also has to be avoided.

DESCRIPTION OF THE RELATED ART

Various methods are known for preparing LiBF$_4$.

JP-A 61 151023 and JP-A 61 151024 describe processes in which LiF is reacted with BF$_3$ in liquid HF to give LiBF$_4$. Impurities then have to be removed in a second step by treatment with elemental fluorine in inert gases or in inert solvents. However, work with liquid HF and with elemental F$_2$ is dangerous, and complicated safety precautions are therefore necessary.

Preparation in organic solvents has also been described in order to avoid preparation in liquid HF.

SU 1013405 describes the preparation of LiBF$_4$ in tetrahydrofuran, in which LiBF$_4$ has good solubility, by reacting LiF with BF$_3$ in yields of from 86–89%. The product is isolated by concentrating the THF solution. This generally gives a product which still has considerable amounts of residual THF. To remove THF completely, drying in vacuo at from 70 to 80° C. for from 10 to 15 hours using specific temperature programs is proposed. Procedures of this type are inconvenient and expensive.

JP-A 56 145113 discloses a process for preparing LiBF$_4$ by reacting LiF with BF$_3$ in non-aqueous organic solvents in which LiBF$_4$ has good solubility and which can form complexes with BF$_3$. Examples mentioned are tetrahydrofuran, dimethoxyethane, ethyl acetate and propylene carbonate. After the reaction of LiF with BF$_3$, impurities are filtered off. LiBF$_4$ is crystallized out from the filtrate by saturating the solution with BF$_3$. With the solvent BF$_3$ forms a complex in which LiBF$_4$ has low solubility, and crystallizes out. Problems with this process are the complete removal of any BF$_3$ adhering to the product and the need to use a considerable excess of BF$_3$. Diethyl ether is not used for the process mentioned since the solubility of LiBF$_4$ in diethyl ether at 25° C. is only 1.3 g/100 ml (JACS, 75 (1953) 1753).

A process has also been disclosed (JACS, 75 (1953) 1753) for preparing LiBF$_4$ in diethyl ether by reacting lithium carbonate with boron trifluoride according to the reaction equation 3 Li$_2$CO$_3$+8 BF$_3$→6 LiBF$_4$+3 CO$_2$+B$_2$O$_3$. The B$_2$O$_3$ formed as coproduct, and also undissolved LiBF$_4$, are filtered off and the filtrate is concentrated to obtain LiBF$_4$. Further amounts of LiBF$_4$ have to be isolated by extracting the filtered-off B$_2$O$_3$/LiBF$_4$ mixture with diethyl ether. However, this process is not cost-effective. Firstly, the low solubility of LiBF$_4$ in diethyl ether means that large amounts of solvent have to be used and then evaporated, and this does not remove the requirement for an additional extraction of the residue. Besides this, some of the BF$_3$ is converted into B$_2$O$_3$ coproduct.

BRIEF SUMMARY OF THE INVENTION

It is an object of the present invention to provide a simple process for cost-effective preparation of highly pure LiBF$_4$ which can be used for producing lithium ion batteries.

We have found that this object is achieved by means of a simple and cost-effective process in which, despite the low solubility of LiBF$_4$ in diethyl ether, LiF can be reacted virtually completely with BF$_3$ etherate and LiBF$_4$ prepared with a high level of purity.

The invention therefore provides a process for preparing highly pure LiBF$_4$ by preparing a solution of BF$_3$ etherate in diethyl ether, suspending LiF in this solution, reacting to give solid LiBF$_4$, and then separating off the solid LiBF$_4$ formed.

The novel process uses BF$_3$ etherate. The BF$_3$ etherate is preferably diluted with diethyl ether. The solution of BF$_3$ etherate in diethyl ether can be prepared by diluting pure BF$_3$ etherate with diethyl ether. It is also possible to pass the desired amount of gaseous BF$_3$ into diethyl ether. The molar ratio of diethyl ether to BF$_3$ etherate is preferably from 0.1 to 3, particularly preferably from 0.5 to 1.5.

Finely divided LiF is added to this solution and suspended in the solution. The LiF is advantageously ground before addition. However, it is also possible to suspend LiF in diethyl ether and to add this suspension to pure BF$_3$ etherate or to a solution of BF$_3$ etherate in diethyl ether, or to pass BF$_3$ gas into the suspension. The amount of BF$_3$ etherate used is at least stoichiometrically equivalent to that of LiF. It is advantageous to work with a small excess of BF$_3$ etherate, but the molar ratio of BF$_3$ etherate to LiF should not be greater than 1.2. The molar ratio of BF$_3$ etherate to LiF is preferably from 1 to 1.1.

The reaction is generally carried out with heating, preferably heating to reflux. The reaction time depends on the temperature selected. The reaction is generally allowed to continue for from 4 to 10 h. However, it is also possible to work at room temperature with a corresponding increase in reaction time.

The suspending of LiF and the reaction to give LiBF$_4$ are advantageously carried out with intensive mixing, for example with the aid of stirrers or of dispersing equipment. Mixing devices and apparatuses of this type are known per se.

The LiBF$_4$ obtained from the reaction, substantially suspended in diethyl ether, is separated off by processes known per se, such as filtration, pressure filtration, centrifuging or decanting, and dried. Before filtering off it is advantageous to cool the suspension at least to room temperature.

Surprisingly, in spite of the low solubility of LiBF$_4$ in diethyl ether, the suspended LiF reacts virtually completely with the BF$_3$ to give LiBF$_4$. The proportion of LiF in the final LiBF$_4$ product is not more than 2% by weight, generally less than 1%. The final product also has only low proportions of acid impurities, low moisture and low proportions of heavy metals. The highly volatile diethyl ether is easily removed from the final product. The residual proportion of organic carbon (total organic carbon, TOC) is less than 0.1% by weight.

DETAILED DESCRIPTION OF THE INVENTION

The following examples are intended to explain the invention in more detail without restricting its scope.

EXAMPLE 1

$BF_3$ etherate (474.5 g; 3.24 mol) was diluted with 400 ml of diethyl ether (3.85 mol) and placed in the Teflon reactor (molar ratio of diethyl ether to $BF_3$ etherate: 1.19). Lithium fluoride from Merck, Suprapur (84 g, 3.24 mol) was introduced into this solution, with stirring and under a blanket of argon (molar ratio of $BF_3$ etherate to LiF: 1.0). The mixture was then stirred under reflux for 7 h, the reflux temperature reducing from 40 to 35° C. The suspension was cooled to 15° C., passed to a pressure filter and filtered. The filter cake was rewashed with diethyl ether. The crystals isolated were dried for 1 h in a current of nitrogen, and then under reduced pressure at 6 mbar.

Product isolated: 254 g of $LiBF_4$ (84% of theory). The B and F NMR spectra of the substance each showed a $LiBF_4$ peak.

Acid impurities (as HF): 100 ppm

LiF: 2%

Na, Fe, Ca and Al: each <1 ppm

TOC: 0.02%

Moisture: <100 ppm

EXAMPLE 2

$BF_3$ etherate (461.0 g; 3.24 mol) was diluted, without pretreatment, with 400 ml of diethyl ether (3.85 mol) and placed in the Teflon reactor (molar ratio of diethyl ether to $BF_3$ etherate: 1.19). Lithium fluoride from Merck, Suprapur (84 g, 3.24 mol) was introduced into this solution, with stirring and under a blanket of argon (molar ratio of $BF_3$ etherate to LiF: 1.0). The mixture was then stirred under reflux for 5 h, the reflux temperature reducing from 42 to 35° C. The suspension was then filtered and the filter cake was washed with diethyl ether. Drying gave 240 g (81% of theory) of $LiBF_4$. The product was then slurried again in diethyl ether, filtered, washed with diethyl ether and dried as in Example 1.

F NMR showed the product to be pure $LiBF_4$.

Acid impurities (as HF): <100 ppm

LiF: 0.78%

Na, Fe, Ca and Al: each <1 ppm

TOC: 0.03%

To prepare an electrolyte solution, $LiBF_4$ was dissolved in a mixture of diethyl carbonate and ethylene carbonate (1 mol/l). The solution was filtered to remove residues of LiF. The water content of the solution was <10 ppm. Residual acid (as HF):6 ppm.

We claim:

1. A process for preparing highly pure $LiBF_4$ in diethyl ether, which comprises preparing a solution of $BF_3$ etherate in diethyl ether, suspending LiF in this solution, reacting to give solid $LiBF_4$ and then separating off the solid $LiBF_4$ formed.

2. A process for preparing highly pure $LiBF_4$ in diethyl ether as claimed in claim 1, wherein the molar ratio of $BF_3$ etherate to LiF is from 1 to 1.2.

3. A process for preparing highly pure $LiBF_4$ in diethyl ether as claimed in claim 1, wherein the molar ratio of diethyl ether to $BF_3$ etherate is from 0.1 to 3.

4. A process for preparing highly pure $LiBF_4$ in diethyl ether as claimed in claim 2, wherein the molar ratio of diethyl ether to $BF_3$ etherate is from 0.1 to 3.

* * * * *